United States Patent [19]

Ugge' et al.

[11] Patent Number: 5,781,850
[45] Date of Patent: Jul. 14, 1998

[54] LIVE VOICE DEVICE FOR CELLULAR PHONES PARTICULARLY OPERABLE IN COMBINATION WITH RADIO RECEIVER APPARATUS IN MOTOR VEHICLES

[75] Inventors: Giuseppe Ugge'; Carmelo Luzzio, both of Milan, Italy

[73] Assignee: Krateia S.r.l., Rome, Italy

[21] Appl. No.: 530,222

[22] PCT Filed: Mar. 28, 1994

[86] PCT No.: PCT/IT94/00037

§ 371 Date: Oct. 3, 1995

§ 102(e) Date: Oct. 3, 1995

[87] PCT Pub. No.: WO94/24774

PCT Pub. Date: Oct. 27, 1994

[30] Foreign Application Priority Data

Apr. 9, 1993 [IT] Italy ................................. MI93A0722

[51] Int. Cl.$^6$ ........................... H04M 11/00; H04Q 7/00
[52] U.S. Cl. ................................. 455/149; 381/86
[58] Field of Search ........................ 379/59, 58; 455/345, 455/346, 89, 90, 6.3, 149, 227; 381/85, 80, 86

[56] References Cited

U.S. PATENT DOCUMENTS

| | | | |
|---|---|---|---|
| 4,691,361 | 9/1987 | Yoshino et al. | 381/86 X |
| 4,734,897 | 3/1988 | Schotz | 381/86 X |
| 5,161,131 | 11/1992 | Borchardt et al. | 369/1 |

*Primary Examiner*—David R. Hudspeth
*Assistant Examiner*—Scott Richardson
*Attorney, Agent, or Firm*—Beveridge, DeGrandi, Weilacher & Young, LLP

[57] ABSTRACT

Subject-matter of this invention is a live voice device particularly for cellular telephone apparatus for use in motor vehicles equipped with a radio receiver apparatus including a low frequency power amplification section and a loudspeaker system for diffusion of sounds and equipped with a magnetic head to read a magnetically recorded tape, having electronic means adapted to handle the cellular phone low frequency signals for a free-hand and in live voice condition conversation with the telephone apparatus and through said loudspeaker system.

19 Claims, 4 Drawing Sheets

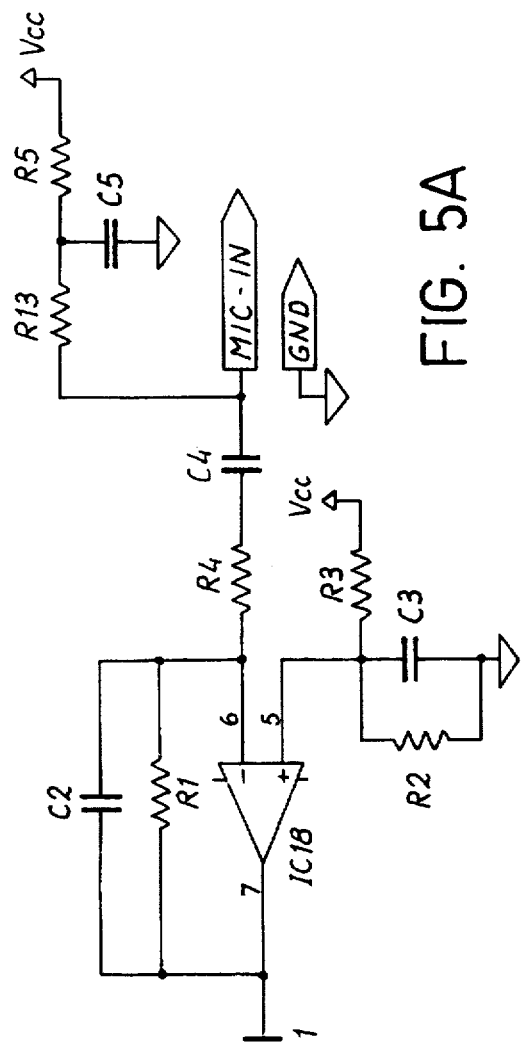
FIG. 5A
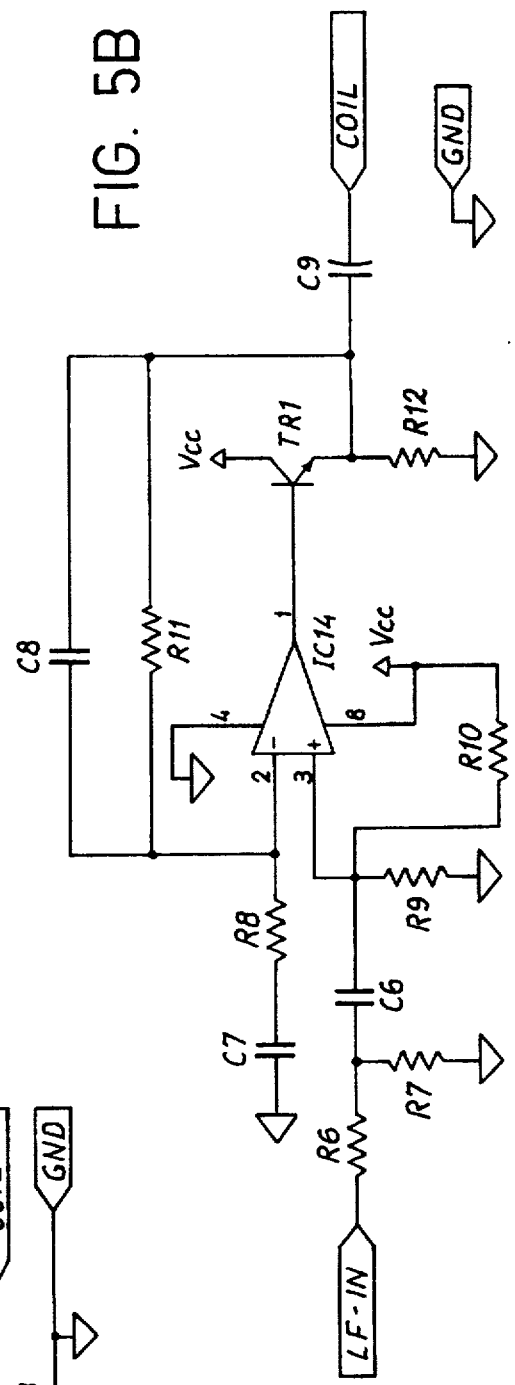
FIG. 5B
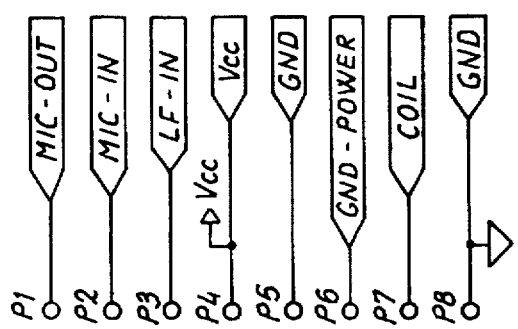

LIVE VOICE DEVICE FOR CELLULAR PHONES PARTICULARLY OPERABLE IN COMBINATION WITH RADIO RECEIVER APPARATUS IN MOTOR VEHICLES

This invention relates to a live voice device, particularly useful for cellular telephones in motor vehicles.

As it is known, in recent times, use of cellular telephones in motor vehicles is achieving a widespread diffusion.

Cellular telephones presently used can be mounted on motor vehicles and can be provided with a so-called live voice device, designed in order to let the driver freely talk without using his/her hands, so as to enable him/her to contemporaneously drive the motor vehicle in full safety conditions.

It is also known that many presently circulating motor vehicles are usually equipped with a car radio receiver provided with a "tape player" or a "cassette player" in order to enable the driver and the passengers to listen to the radio programs or to music recorded on magnetic tapes by means of electro-acoustic transducers, such as loudspeakers, at an acoustic intensity (volume) as desired by the listener.

In view of the above, it can be easily understood that any live voice devices for use with cellular telephones should be housed within the dashboard of the vehicle, thereby resulting into noticeable encumbrance and often into aesthetic inconveniences.

Furthermore, when the driver is listening to the car radio receiver and desires to make or to receive a phone call, he/she is obliged to effect rather dangerous manoeuvres due to the fact that, in addition to driving the vehicle, he/she should lower the acoustic volume of the car radio receiver and subsequently enable the cellular telephone apparatus for instance by pressing a button.

In addition to the inherent hazards and difficulties of the above mentioned manoeuvres, it is clear that a live voice device of the already known construction, in addition to a noticeable encumbrance, is rather expensive, due to the fact that it should include all electronic circuitry needed for handling the low frequency and low power telephonic signals, in particular at least a pre-amplifier stage, designed to rise the telephonic signal to a level at least sufficient to enable its subsequent power amplification, thereby making it suitable for being reproduced by means of loudspeakers.

It is an object of this invention to eliminate the drawbacks of the prior art and to propose a live voice device, in particular for use with cellular telephones in motor vehicles, which utilizes for its operation the electronic circuitry already existing in a car radio receiver or at least a portion thereof, so as to let the dashboard of the vehicle to remain to the maximum possible extent unencumbered.

In the frame of this problem, it is an important object of this invention to propose a live voice device adapted to utilize in its operation the acoustic loudspeakers already existing in the vehicles and connected to the radio receiver apparatus thereof.

It is a further object of this invention to propose a live voice device adapted to permit to automatically utilize for its operation a single apparatus (a radio receiver apparatus) both for listening to the radio programs or to recorded music and for using the cellular telephone, and which at the same time supplies the electric power needed for operation of the telephone, without discharging its batteries.

It is a still further object of this invention to propose a live voice device adapted to automatically reduce or completely null the acoustic volume of the car radio apparatus, should the cellular telephone apparatus be enabled to receive or to effect a call.

It is a still further object of this invention to propose a live voice device capable to eliminate the need to mount additional loudspeakers and environmental microphones and adapted to utilize at the same time further additional apparatus, such as a telephone answering device, electronic outputs for fax reception and computer connections, as well as the possibility to use a masking device for the telephonic conversation.

This problem is solved and the above and other objects are fulfilled by means of a live voice device particularly for cellular telephone apparatus for motor vehicles equipped with a radio receiver apparatus including a low frequency power amplification section and a loudspeaker system for diffusion of sounds and equipped with a magnetic head to read a magnetically recorded tape, comprising electronic means adapted to handle the cellular telephone low frequency signal for a free-hand and in live voice condition conversation with the telephone apparatus and through said loudspeaker system.

Further features and advantages of this invention will be more evident from the description of some preferred but not exclusive embodiments of the live voice device of this invention, as shown by way of illustration and not of limitation in the enclosed drawings, wherein:

FIGS. 5A and 5B show two amplifier sections of the live voice circuit of the device according to this invention.

Figure 1:
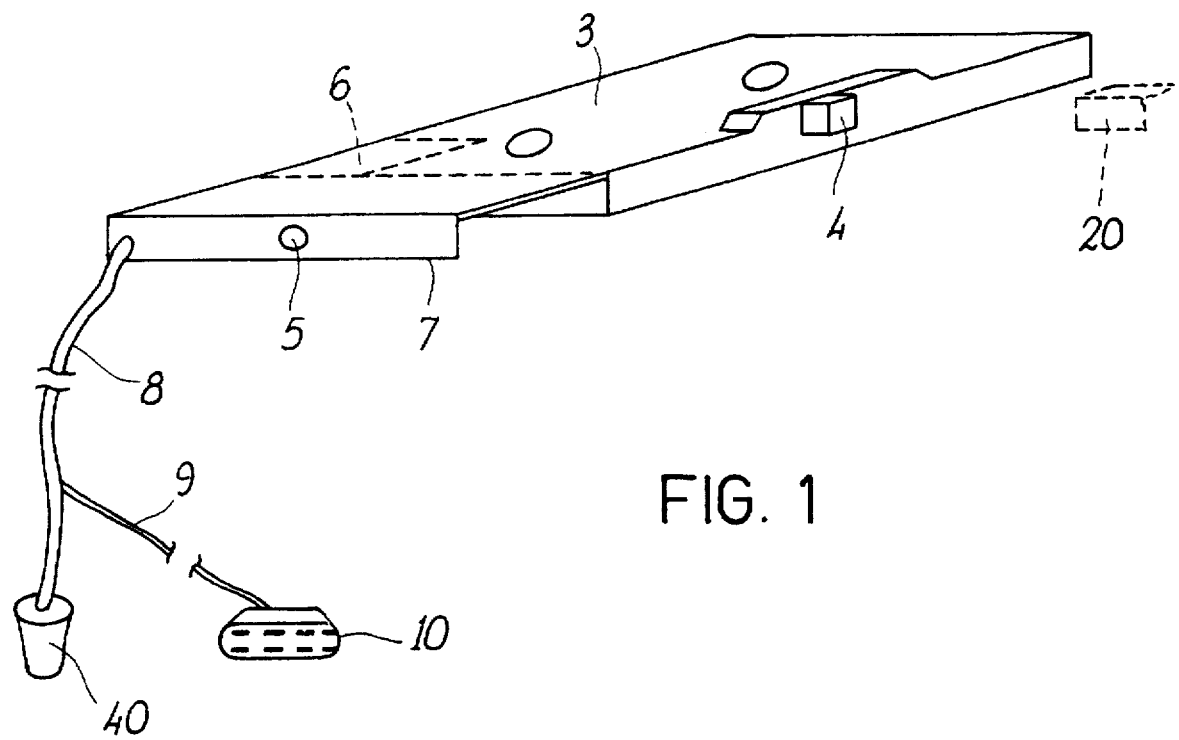
FIG. 1 is a schematic perspective view of a device according to the invention, manufactured as a dummy cassette housing all electronic means adapted to handle the cellular telephone low frequency signals, such cassette being designed so as to cooperate with the vehicle radio receiver apparatus by insertion into the slot of the cassette player thereof.

By referring now to the above mentioned Figures, it will be now shown that a live voice device, in particular for cellular telephone apparatus for motor vehicles, according to this invention, comprises component electronic and mechanical sections which can be independently manufactured, in some embodiments, or can be substituted by analogous already existing sections of a radio receiver apparatus equipped with a magnetic reading head for reproducing sounds recorded on a per se known magnetic tape, not shown in the drawings. Basically, such sections have, for instance, a pre-amplification section, a power amplification section, one or more loudspeakers, a switching-over section for managing all shared component sections without interferences and overlaps between the radio receiver function and the telephone live voice function.

In the principle embodiment, the electronic means generally designated by 2, adapted to handling the low frequency signals of a cellular telephone apparatus of per se known kind, not shown in the drawings, adapted to enable a free-hand live voice conversation, are associated to the radio receiver apparatus.

In particular, in a first embodiment of the live voice device, the electronic means 2 are housed in a dummy cassette 3 having a shape substantially identical to the shape of a conventional cassette provided with magnetic tape, so as to be suitably and removably inserted into the appropriate slot of the radio receiver apparatus.

The dummy cassette 3 does not include a magnetically recorded tape as in conventional cassettes: it has instead a magnetic transducer 4 adapted to generate a magnetic field modulated according to an electric signal coming from the cellular telephone apparatus, when the latter is in listening or receiving status.

To this effect, when the above mentioned dummy cassette 3 is inserted into the radio receiver apparatus through the usual inlet slot, the magnetic transducer 4 is arranged so as to face the reading head 20 of the "tape player" provided in the radio receiver apparatus, so that the magnetic head is enabled to pick up the magnetic field generated by magnetic transducer 4 and to convert it into a low frequency electric signal.

The concerned low frequency electric signal picked up by the reading head 20 is subsequently amplified by the low frequency amplification sections of the radio receiver apparatus and, therefore, it can be heard through the loudspeakers 21 of same.

The dummy cassette 3 also includes a microphone 5 associated to a pre-amplifier 6 adapted to transmit a voice electric signal of suitable level to the cellular telephone apparatus in order to permit a free-hand and live voice conversation there through.

More particularly, said microphone 5 is housed in a sidewall 7 of the dummy cassette 3 which is arranged outwardly of the radio receiver apparatus when the dummy cassette 3 is introduced thereinto, in order that the magnetic transducer 4 is placed facing the reading head 20, as above described.

The sidewall 7 can be directly a sidewall of cassette 3 or it can be defined by an extension thereof.

The dummy cassette 3, in addition, is provided with an electric cable 8 which enables the electric supply to be derived for instance from the electric lighter socket of the vehicle, by means of a suitable jack plug 40, to power the reading head, the pre-amplifier circuit and the microphone, etc.

Furthermore, the electric cable 8 has a branch defined by a suitably sized cord 9 to connect the dummy cassette 3 to the cellular telephone apparatus by means of a connector 10.

Figure 2:
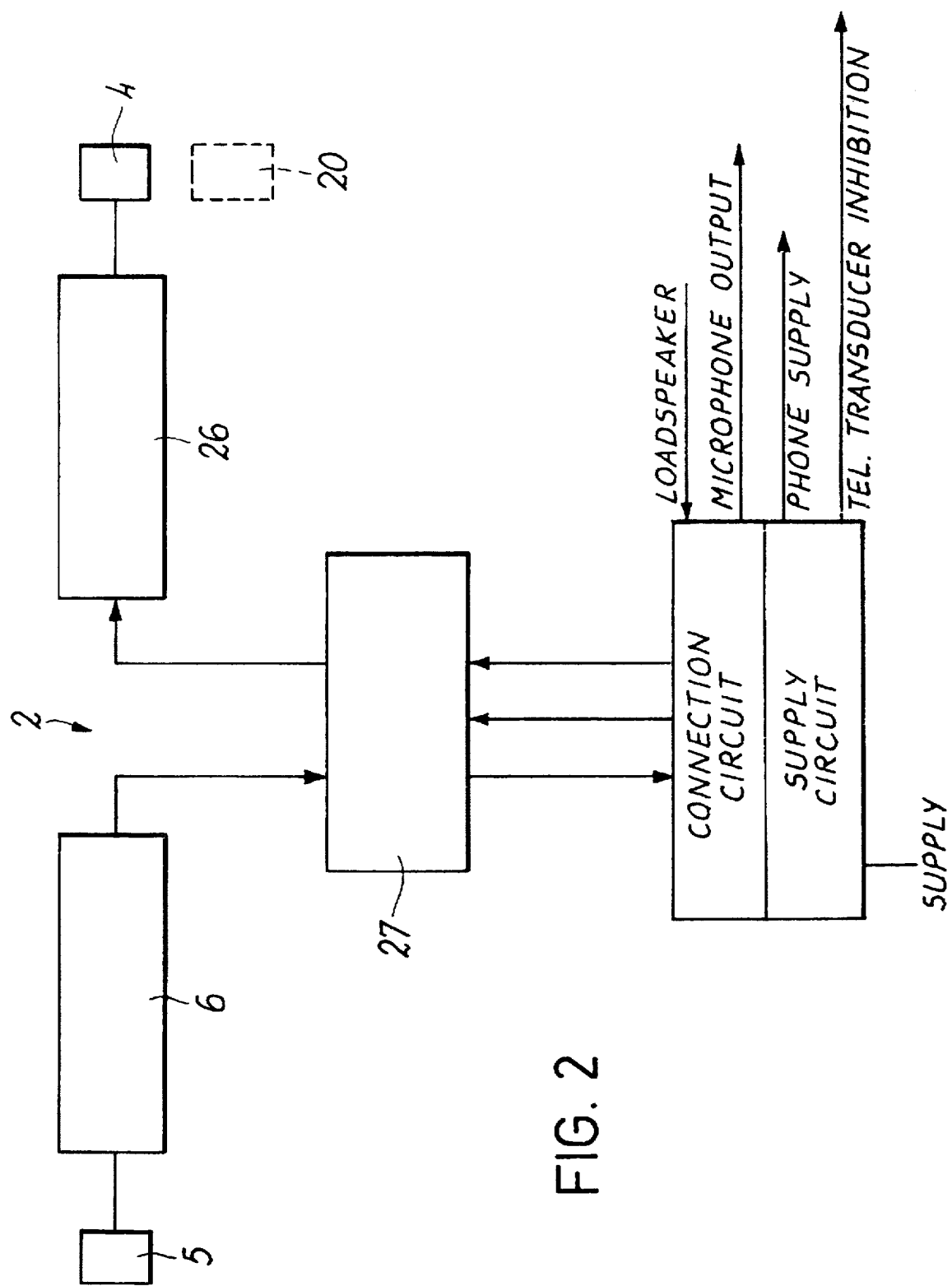
FIG. 2 shows a block diagram of the cassette shown in FIG. 1.

From an electronic view point, the above described dummy cassette houses an electronic circuitry as shown in block diagram form in FIG. 2, consisting of electronic circuits which will be now detailedly described.

A first electronic circuit acting as a microphone pre-amplifier, as shown in FIG. 5A, operates to present a signal of suitable level to the input of the telephone connection. It is substantially comprised of an operational amplifier circuit IC 18 with subsidiary circuitry and per se known passive components, as it will be understood by those skilled in the art. This amplifier section has a pass band corresponding to the telephonic pass band.

The second circuit, acting as a voltage pre-amplifier, operates in order to transfer the signal coming from the telephone apparatus to the magnetic transducer and to a loudspeaker system or to a piezoelectric transducer, so designed as to reproduce the sounds at a level suitable for the sounds to be heard without the need to put the ear close to the sound source. Such a circuit is shown in FIG. 5B and it is comprised of an operational amplifier IC 14 with a transistor TR1 and usual passive components well comprehensible to those skilled in the art. A circuit like the above described one operates as voltage and current amplifier, which is indispensable to correctly drive the coil by which the low frequency signal is brought to the magnetic head of the tape player associated to the radio receiver apparatus. The filters appearing in this stage operate in order to compensate the frequency response of the coil.

Lastly, an inhibition circuit, not detailedly illustrated, but having a well known structure, provides for sending to the telephone apparatus the enabling command for the signals addressed to the external live voice device.

The electric power supply for the above set forth circuits is 35 furnished by a circuit housed in an autonomous package, usually commercially available, operating to stabilise and to lower the 13.5 VDC (voltage level of the battery of the motor vehicle) derived from the electric lighter socket to 8.11 VDC.

A connection extension provides for housing the microphone and a first connection to the cables (supply cable and connection cable for the telephone apparatus) so as to connect the cassette by means of a single cable.

It will be clear that the radio receiver apparatus, when the connection of the cellular telephone apparatus is removed, can operate in conventional manner like any radio receiver apparatus or like any "cassette player" and only when the necessity arises to make or to receive a telephone call it will be possible to introduce the above illustrated dummy cassette into the existing inlet slot, as it were a real cassette bearing recorded information, in order to enable a live voice, free-hand conversation to be carried out through the cellular telephone apparatus and the loudspeaker system of the radio receiver of the vehicle.

Figure 3:
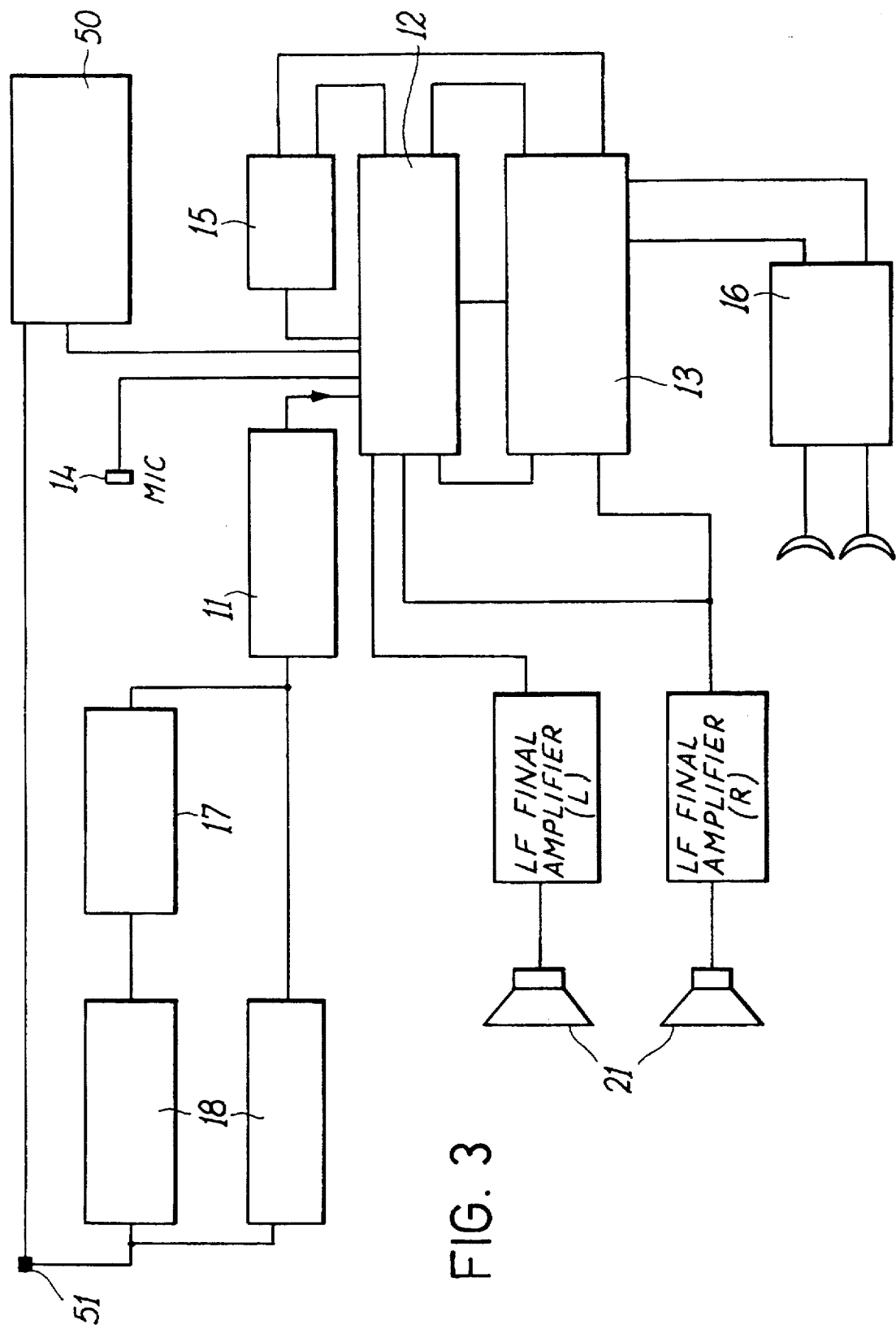
FIG. 3 shows a block diagram of the modified circuitry of the vehicle radio receiver apparatus in order to enable the latter to operate as a live voice device.

In a second embodiment, said electronic means upon being suitably modified and adjusted are integrally comprised in the circuitry of the radio receiver apparatus, as it can be observed in the block diagram of FIG. 3.

The block diagram of FIG. 3 shows, by way of exemplification, a car stereo radio receiver apparatus with associated tape player, with two frequency ranges. For reasons of clearness and simplicity, the circuit related to the servo control mechanism for driving the cassette tape and any other electronic components not strictly necessary for comprehension of this invention have not been included in the Figure.

By way of exemplification, only the low frequency section downstream of the second intermediate frequency block 11 will be examined.

The output signal from the intermediate frequency block 11 is a low frequency signal and is applied to an automatic switch-over or live voice circuit 12, which is activated by the low frequency telephone call signal.

The automatic switch-over circuit 12 provides for amplifying the telephone signal into the loudspeaker system after having processed it through a stereo amplifier 13 also having a tone control capability.

Furthermore, a microphone 14 is connected to the input of one of the two channels of the amplifier 13 or of an additional amplifier (not shown), the microphone 14 being used for enabling, through the proper output connection selected by the switch-over circuit 12, a live voice free hand conversation through the cellular telephone apparatus and said loudspeaker system.

In addition, the circuitry comprises in per se well known manner, a stereo decoder 15 and an equalised pre-amplifier 16, which are not part of this invention.

Also in per se known manner, the illustrated circuitry comprises, upstream of the second intermediate frequency block 11, a first intermediate frequency block 17 and two receivers 18 for two frequency ranges.

This technical approach permits also a telephone answering device to be implemented by utilizing circuits and mechanical sections already existing in the car radio receiver apparatus and in the cassette player associated thereto, by possible integration with an equalised preamplifier according to international specifications "N.A.B.".

For enabling a telephone answering system to be implemented, the electronic means according to this invention comprise, placed close to the magnetically recorded tape reading head, a magnetic transducer to erase and/or to record any signals coming from the live voice circuit 12, as well as a voice synthesising circuit (not shown), which is activated by the same live voice circuit 12, in order to answer a call on the cellular telephone apparatus by a voiced message.

It is also possible to include a conversation masking circuit into a live voice circuitry, as it can be observed by designation 27 in FIG. 2.

Figure 4:
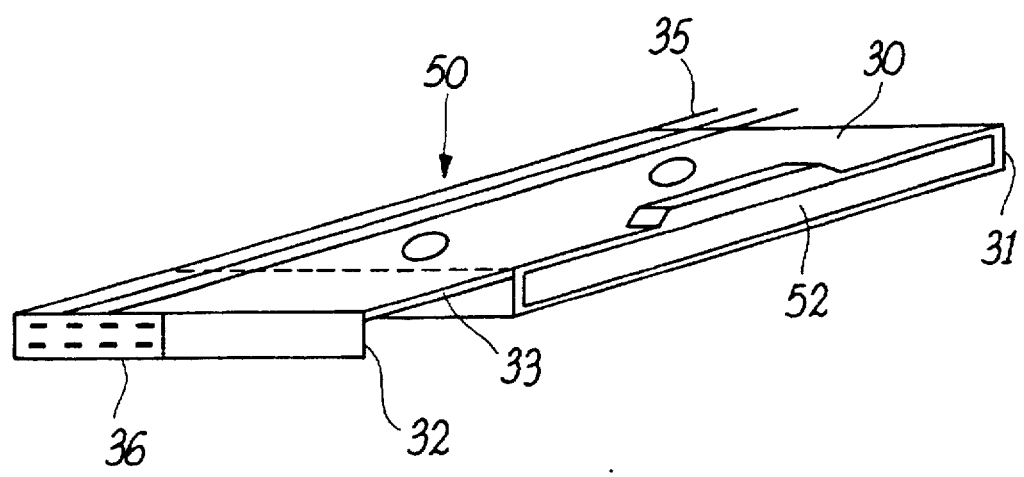
FIG. 4 shows a different embodiment of the device according to the invention, manufactured as a cassette for electronic connection between a cellular telephone apparatus and a car radio receiver apparatus.

As it is shown in FIG. 4, a connection support 50 is designed to cooperate with a radio receiver apparatus according to this invention, in order to connect a fax apparatus and/or a data processor and/or other final user apparatus directly to the live voice circuit 12 included in the car radio receiver apparatus and already described as an automatic switchover circuit.

The above connection support can be conveniently designed for direct connection to a pre-existing antenna 51 provided for the radio receiver apparatus or for an additional telephone apparatus.

The connection support in a different embodiment comprises again a dummy cassette 30 having on a sidewall 31 thereof a male plug 35 designed for insertion into an associated female socket internally provided in the radio receiver apparatus.

On the opposite side, the dummy cassette has, on its sidewall 32 an extension 33, wherein a socket 36 is provided for receiving the connector plug 10 of the cellular telephone apparatus and/or of the telephone answering system and/or fax and/or data processor.

By using a dummy cassette 30, as it can be easily understood, it will also be possible to utilize it as a telephone answering device, since the required tape driving mechanism and the tape 52 itself are already available therein.

Summarizing, in this embodiment, the telephone signal is directly sent to the radio receiver apparatus, without using a transducer (such as transducer 4 in the previous embodiment) and the dummy cassette already includes a tape for operation as a telephone answering device. The above mentioned plug 35 operates also as a connection means to be used in coupling the requested signals for driving the tape and for enabling/disabling the recording/ playing functions.

As a matter of facts, it has been found that a device according to this invention is particularly advantageous to enable a live voice free hand conversation with a cellular telephone apparatus by utilizing to this effect at least a portion of the circuitry and of the mechanics, in particular the low frequency amplification sections and the loudspeaker system, already existing within the car radio receiver and tape player apparatus presently commercially available.

By this approach, in addition for noticeably reducing the encumbrance upon the dashboard of the vehicle and for lowering the installation costs for a live voice device, it is possible to achieve an automatic switch-over between the operation of the radio receiver or tape player and the operation of the cellular telephone apparatus, without carrying out unsafe manoeuvres.

The invention as up to now designed and illustrated is open to a number of changes and variations, all of which are comprised in its inventive concepts; furthermore, all details can be substituted by technically equivalent elements.

A further embodiment of the device according to this invention is suggested by the consideration that some car radio receiver apparatus also have an external socket, provided in their front panel, designed for connection of a Compact Disc player thereto, in order to permit a user to listen to CD's played therein. In this embodiment, the concerned device operates an interface device, also housing the necessary electronic circuitry. However, it is not necessary for it to have a particular shape, as in the case of a dummy cassette; it is sufficient that it is made as a simple box, or it can be the same connection plug, provided that it is suitably sized to house the necessary components. In this embodiment, the device comprises as component parts the microphone pre-amplification circuit, the microphone to take the voice to the telephone apparatus and the inhibition section. The voltage amplifier circuit is no longer necessary, since the magnetic transducer itself is no longer necessary, in view of the fact that the telephone signal is directly coupled to the low frequency amplification section of the radio receiver.

The connection between power supply, telephone apparatus and radio receiver apparatus is effected by means of the same interface device.

In all up to now described embodiments, the connection means between the telephone and the radio receiver apparatus have always been made as cables, possibly shielded cables, with associated plugs and suitable sockets. It should be understood, however, that such connections, which, in conclusion, are intended for transmission of signals, can also be implemented by infra-red rays or by radio waves.

In the first case, an infra-red receiver is housed in the front panel of the car radio receiver and is interfaced to an infra-red transmitter which is connected to the dedicated connector of the cellular telephone apparatus. The received telephone signal is transmitted from the infra-red transmitter associated to said cellular telephone apparatus to the infra-red received housed in the car radio receiver and the latter, by means of modifications obvious to those skilled in the art, couples the above signal to the low frequency amplification section of the radio receiver, thereby providing for its reproduction by means of the loudspeaker system of the radio receiver itself. The required microphone for voice transmission can be housed in the adapter for connection to the electric lighter of the car, which provides for power supply both to the cellular telephone apparatus and to the infra-red transmitter associated thereto.

In the second case, a very low power (for instance, 10 mW) mini transmitter, that can be designed by any person skilled in the art, could be housed in an extension coupled to the cellular telephone apparatus connector, so as to transmit an input telephone conversation to the car radio receiver, without using connection cables or dummy cassettes or any other interface devices.

The above mentioned mini transmitter is conveniently tuned on a given frequency pre-set in the car radio receiver, so that, when a telephone call is received, it is sufficient to press the corresponding tuning button for receiving the telephone call in live voice from the loudspeaker system of the car radio receiver. Also in this case, an amplified microphone connected to the telephone apparatus is housed in the adapter designed for coupling to the electric lighter of the car, thereby enabling to power both the cellular telephone apparatus and the mini transmitter associated thereto.

Of course, means can be provided to vary the transmission frequency, thereby avoiding any interferences with local transmitter stations operating on the same frequencies.

As a matter of fact, the employed materials and the dimensions can be arbitrarily selected according to the requirements and to the state of the art.

We claim:

1. A live voice device for use between a portable cellular telephone and a vehicle with a radio receiver and cassette player with accompanying loudspeaker system, the radio receiver and tape player having a magnetic head for reading a magnetically recorded tape, said live voice device comprising:

a microphone;

an electronic telephone pre-amplifier circuit connected to said microphone;

an external connection means for connecting to the cellular telephone and a power supply of the vehicle, said external connection means connected to said electronic telephone pre-amplifier circuit;

a voltage amplifier circuit connected to said external connection means;

a magnetic transducer connected to said voltage amplifier circuit and magnetically in communication with the magnetic head; and a conversation masking circuit connected to said electronic pre-amplifier circuit, said voltage amplifier circuit, and said external connection means.

2. A live voice device according to claim 1, wherein said telephone pre-amplifier includes an operational amplifier and a filter with a pass band identical to a pass band of the cellular telephone.

3. A live voice device according to claim 1, wherein said voltage amplifier circuit includes;

a NPN transistor, an operational amplifier connected to a base of said NPN transistor, at least one coil connected to said operational amplifier, and at least one filter connected to said at least one coil for compensating a frequency response of said at least one coil.

4. A live voice device according to claim 1, wherein said external connection means includes an infra-red transmitter connected to the cellular telephone, an infra-red receiver mounted on a front panel of the radio receiver, and an adaptor connected to an electric lighter socket of the vehicle housing said microphone and supplying power to the cellular telephone and the infra-red transmitter.

5. A live voice device according to claim 1, wherein said external connection means includes a radio mini-transmitter connected to the cellular telephone, a radio mini-receiver mounted on a front panel of the radio receiver, and an adaptor connected to an electric lighter socket of the vehicle housing said microphone and supplying power to the cellular telephone and the radio mini-transmitter.

6. A live voice device according to claim 1, further comprising means for automatically switching-over a preset transmission frequency in the radio receiver to avoid interference with a received radio frequency should the interference occur.

7. A live voice device according to claim 1, wherein said magnetic transducer communicates with the reading head through the creation of a magnetic field corresponding to an electrical signal originating with the cellular telephone such that a distance between said magnetic transducer and the reading head permits this communication.

8. A live voice device according to claim 1, further comprising a dummy cassette to house said microphone, said magnetic transducer, said electronic telephone pre-amplifier circuit, and said voltage amplifier circuit;

whereby, said dummy cassette having a shape of a conventional cassette to be able to be inserted into the tape player of the vehicle.

9. A live voice device according to claim 8, wherein said dummy cassette without magnetic tape is connected to said external connection means and distributes the received power and telephone signal to respective elements on said dummy cassette.

10. A live voice device according to claim 8, wherein said dummy cassette further including a sidewall to hold said microphone outwardly spaced from an end of said dummy cassette inserted into the tape player of the vehicle; and whereby, when said dummy cassette is inserted into the tape player of the vehicle, said magnetic transducer fronts the reading head.

11. A live voice device for use between a portable cellular telephone and a vehicle with a radio receiver and tape player with accompanying loudspeaker system, the radio receiver and cassette player having a magnetic head for reading a magnetically recorded tape, an intermediate frequency amplifier, and a stereo amplifier, said live voice device comprising:

a microphone, and electronic means for handling a low frequency signal from the cellular telephone and connected to said microphone, said electronic means resides in the radio receiver and cassette player, said electronic means including an automatic switch-over circuit activated by the low frequency signal from the cellular telephone for directing an output from said microphone, said automatic switch-over circuit connected to the intermediate frequency amplifier, the stereo amplifier, and said microphone.

12. A live voice device according to claim 11, wherein said automatic switch-over circuit includes a conversation masking circuit.

13. A live voice device according to claim 11, further comprising a connection means for connecting to an external device from a group comprising a facsimile device, data processor, telephone answering machine, and the cellular telephone, said connection means including a dummy cassette having a first sidewall having a male plug to engage a female socket internal to the radio receiver and tape player and a second sidewall having a socket.

14. A live voice device according to claim 13, further comprising:

a magnetic transducer connected to said automatic switch-over circuit to erase and record signals from said automatic switch-over circuit, and a voice synthesizing circuit connected to said automatic switch-over circuit to play a message when activated by said automatic switch-over circuit.

15. A live voice device according to claim 13, wherein said external connection means includes an infra-red transmitter connected to the cellular telephone, an infra-red receiver mounted on a front panel of the radio receiver, and an adaptor connected to an electric lighter socket of the vehicle housing said microphone and supplying power to the cellular telephone and the infra-red transmitter.

16. A live voice device according to claim 13, wherein said external connection means includes a radio mini-transmitter connected to the cellular telephone, a radio mini-receiver mounted on a front panel of the radio receiver, and an adaptor connected to an electric lighter socket of the vehicle housing said microphone and supplying power to the cellular telephone and the radio mini-transmitter.

17. A live voice device according to claim 13, further comprising means for automatically switching-over a preset transmission frequency in the radio receiver to avoid interference with a received radio frequency should the interference occur.

18. A live voice device for use between a portable cellular telephone and a vehicle with a radio receiver and tape player with accompanying loudspeaker system, the radio receiver and cassette player having a magnetic head for reading a magnetically recorded tape and an external socket to connect with a compact disc reader, said live voice device in an autonomous package comprising:

a microphone;

an electronic telephone pre-amplifier circuit connected to said microphone;

an inhibition circuit for sending an enabling command to the cellular telephone;

an external connection means for connecting to the cellular telephone and a power supply of the vehicle, said external connection means connected to said electronic telephone pre-amplifier circuit; and means for connecting to the external socket of the radio receiver and tape player.

19. A live voice device according to claim 18, wherein said external connection means is cable, a connector plug to connect to a power supply, and a connector plug to connect to the cellular telephone.

* * * * *